W. G. COX.
BUMPER ATTACHMENT FOR AUTOMOBILES.
APPLICATION FILED NOV. 19, 1921.

1,409,675.

Patented Mar. 14, 1922.
2 SHEETS—SHEET 1.

Inventor
W. G. COX

By Fisher Moser & More
Attorneys

W. G. COX.
BUMPER ATTACHMENT FOR AUTOMOBILES.
APPLICATION FILED NOV. 19, 1921.
1,409,675.
Patented Mar. 14, 1922.
2 SHEETS—SHEET 2.
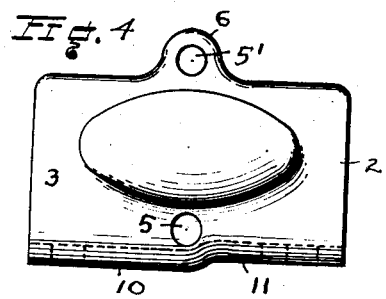
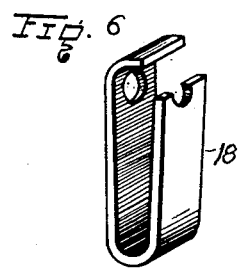
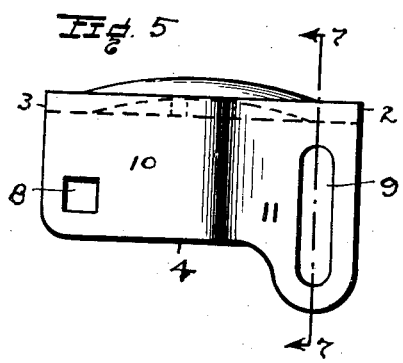
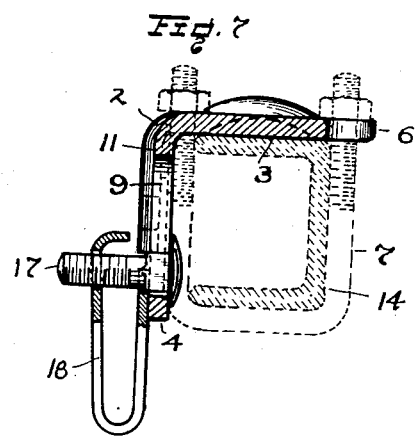
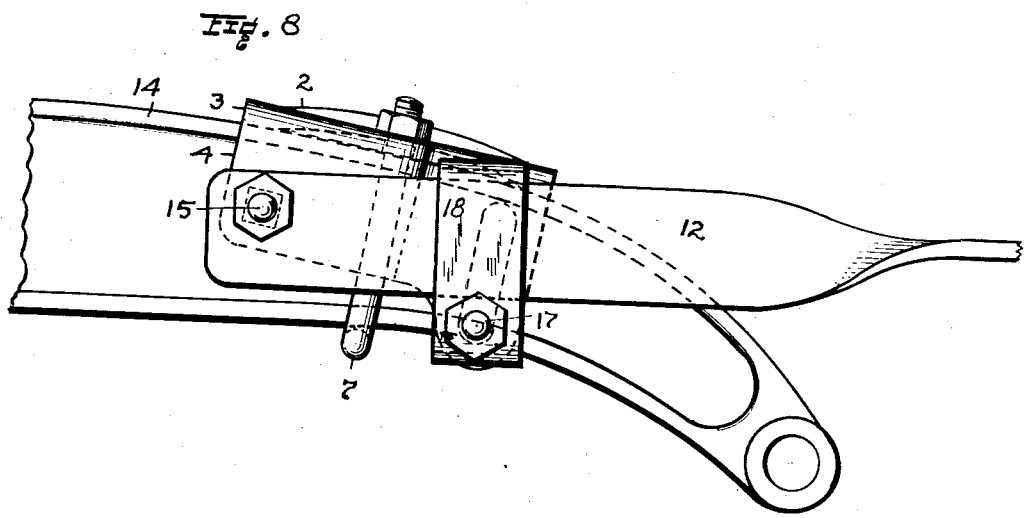
Inventor
W. G. COX.
By Fisher—Moser+Moore
Attorneys

UNITED STATES PATENT OFFICE.

WILLIAM G. COX, OF CLEVELAND, OHIO, ASSIGNOR TO COX BRASS MANUFACTURING COMPANY, OF ALBANY, NEW YORK, A CORPORATION OF NEW YORK.

BUMPER ATTACHMENT FOR AUTOMOBILES.

1,409,675. Specification of Letters Patent. Patented Mar. 14, 1922.

Application filed November 19, 1921. Serial No. 516,320.

*To all whom it may concern:*

Be it known that I, WILLIAM G. Cox, a citizen of the United States, residing at Cleveland, in the county of Cuyahoga and State of Ohio, have invented certain new and useful Improvements in Bumper Attachments for Automobiles, of which the following is a specification.

This invention relates to an improvement in a bumper attachment for automobiles, and the object of the invention is to provide a convenient and reliable mode of attaching a bumper arm or bumper supporting bar adjustably at one side of the channeled side members of the chassis frame, and more particularly opposite the inner open side of such channeled members where curved downwardly at their ends to connect with the springs.

Figure 1:
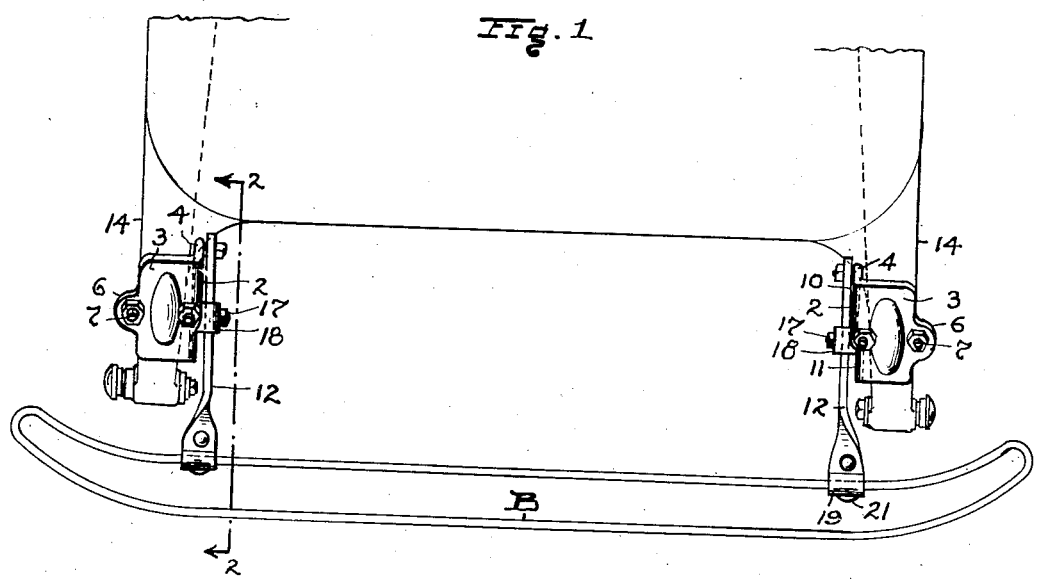
Figure 2:
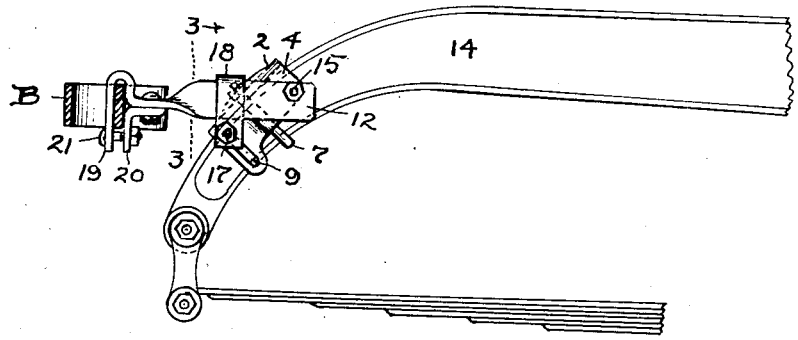
Figure 3:
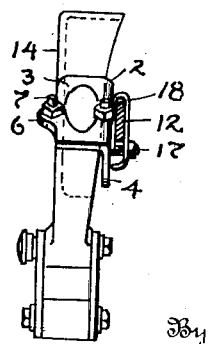

In the drawings accompanying this application, Fig. 1 is plan view on a reduced scale of a bumper affixed by my improved attachment to one end of the frame of an automobile. Fig. 2 is a side elevation of the attachment and a sectional view of the bumper on line 2—2 of Fig. 1. Fig. 3 is a front view and cross-section, on line 3—3 of Fig. 2. Figs. 4 and 5 are top and side views respectively, of the angular clamping plate alone. Fig. 6 is a perspective view of the spring clamping hanger alone, and Fig. 7 is a cross-section of the angle plate on line 7—7 of Fig. 5, showing the clamping hanger affixed thereto. Fig. 8 is an enlarged side view of the attachment showing a different setting of the parts to suit a different curvature of frame from that shown in Fig. 2.

The attachment comprises a sheet-metal plate 2 pressed or stamped into angular form to provide a flat or slightly curved seating portion or wing 3 and also a flat-sided depending portion or flange 4 which is vertically offset at about its middle to provide two flat faces in different vertical planes. A bolt opening 5 is provided in the wing opposite the offset and a second bolt opening 5' is formed in a projecting ear 6 at the outer edge of said wing, these two openings being oppositely related to receive the legs of a U-bolt 7 when clamping the parts upon the channeled frame 14. Flange 4 has a square bolt opening 8 in the corner of its protruding portion 10 and a vertical slot 9 in its retired portion 11, and as shown portion 11 extends downwardly to permit a relatively long vertical slot 9 to be made therein at the front end of this angle member or plate. The upper side or wing 3 is also dished upwardly in its central area to provide spaced seating surfaces at the opposite ends of wing 3 so that said angle member or plate may be clamped immovably at an inclination lengthwise upon the curved upper face of the channeled side members 14 of the automobile. The angle of inclination of this plate will vary according to the degree of curvature of frame 14 and the particular place occupied by the plate on this curved part of the frame, and in Figs. 2 and 8 I show two differently curved frames and adjusted settings, with the bumper B supported horizontally in both instances by arms 12 which extends forwardly from pivot bolts 15 in openings 8 in the vertical flange portions 10 of the plates.

The universal practice is to employ a channeled frame 14 with the open side facing inward, and flange 4 is expressly provided to span this open side to permit the bumper arm to be supported upon the inner side of the frame whenever such a setting is desired or an exigency exists as in the case of cars having interfering fittings, fenders or other attachments on the outside. A screw-threaded bolt 17 having a squared portion is adjustably seated within vertical slot 9, and a spring clip or open loop 18 at corresponding ends in its opposite sides through which bolt 17 extends to support the clip pivotally at the side of flange 4 with the engaging side of the clip or loop occupying the recess or offset space in the flange so that the pivoted end of the bumper-supporting arm 12 may bear flatwise against the protruding face 10 of flange 4 and extend in a straight line through the clip or loop 18. In adjusting the arm slot 9 permits bolt 17 to be shifted to change the pivot center for clip 18, and the clip may be turned either upwardly or downwardly or to any angle relatively to plate 2.

The outer free end of arm 12 is provided with a spring extremity 19, and a separate angular piece 20, and bolts 21 serve to clamp bumper B in rigid attachment therewith, but the form or kind of bumper or the mode of attaching the bumper to the arm may be modified or changed very materially without affecting the actual invention residing in the organization of the other parts herein described.

What I claim, is:

1. A bumper attachment for automobiles, comprising a flanged plate, means adapted to fasten said plate to a channeled vehicle frame with the flange opposite the open side thereof, a bumper-supporting arm pivotally connected with said flange, and means adapted to adjustably secure said arm in different angular relations with said plate.

2. A bumper attachment for automobiles, comprising an attachment plate, a bumper supporting arm pivotally connected with said plate, and a supporting clip for said arm adjustably connected with said plate.

3. A bumper attachment for automobiles, comprising an attachment plate having a depending flange, a bumper supporting arm pivotally connected with said flange, and a clip pivotally connected with said flange adapted to support said arm adjustably at the side of said flange.

4. A bumper attachment for automobiles, comprising an attachment plate having a depending flange with an offset therein, a bumper supporting arm pivoted to said flange, and an arm supporting clip adjustably mounted within said offset.

5. A bumper attachment for automobiles, comprising an angular plate having a slot in one side thereof, means adapted to clamp said plate upon the frame end of an automobile, a bumper supporting arm pivotally connected with said plate, a bolt in said slot, and a clip for said arm rotatably mounted upon said bolt.

6. A bumper attachment for automobiles, comprising an angular plate having a dished upper side and a slotted flange, a U-bolt engaged with said upper side adapted to fix said plate upon the frame end of an automobile, an arm pivotally bolted upon said flange, a U-shaped holding clip for said arm, and a clamping bolt adjustably mounted within the slotted flange.

In testimony whereof I affix my signature in presence of two witnesses.

WILLIAM G. COX.

Witnesses:
GEO. E. KRICKER,
DOROTHY MOSER.